UNITED STATES PATENT OFFICE.

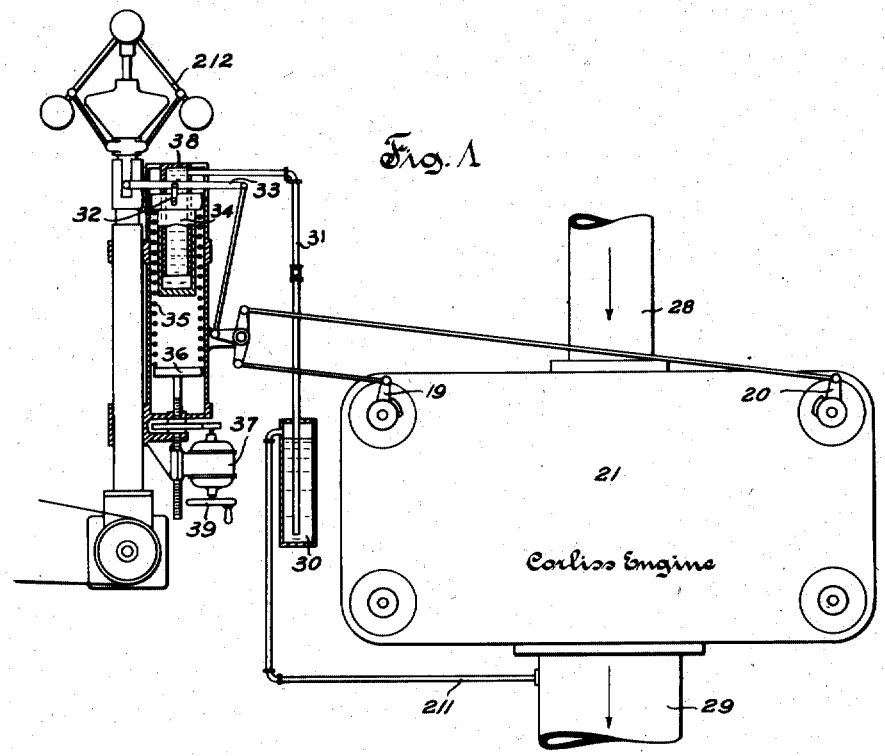
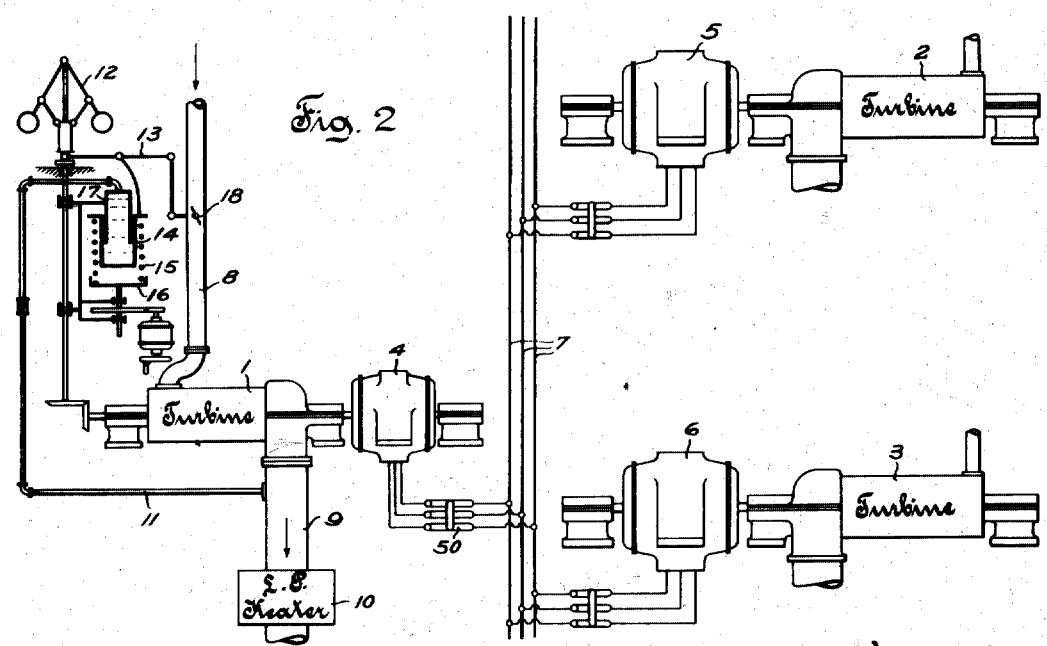

REGINALD F. SMITH, OF WEST ALLIS, WISCONSIN, ASSIGNOR TO ALLIS-CHALMERS MANUFACTURING COMPANY, OF MILWAUKEE, WISCONSIN, A CORPORATION OF DELAWARE.

ENERGY-TRANSLATING DEVICE.

1,279,769.   Specification of Letters Patent.   Patented Sept. 24, 1918.

Application filed May 22, 1915. Serial No. 30,235.

*To all whom it may concern:*

Be it known that I, REGINALD F. SMITH, a citizen of the United States, residing at West Allis, in the county of Milwaukee and State of Wisconsin, have invented a certain new and useful Improvement in Energy-Translating Devices, of which the following is a specification.

This invention relates to improvements in the construction and operation of energy translating devices for furnishing energy with one or more constant characteristics.

An object of the invention is to provide an energy translating device which is simple in construction and efficient in operation. Another object is to provide an energy translating device adapted to furnish energy with one or more substantially constant characteristics. Several of the more specific objects of the invention are as follows:

To provide an energy translating device, the speed of which is controllable by an external agency, the device being adapted to simultaneously deliver energy to an energy absorber and to maintain substantially constant certain characteristics of the energy delivered.

To combine with a heat engine means for controlling the engine speed by an external agency and means for controlling both the pressure and the temperature of the engine exhaust.

To control the speed of an engine by parallel operation of an electric generator driven thereby with other generators, and to simultaneously control the energy supplied to the engine by variations in characteristics of the engine exhaust.

A clear conception of several embodiments of the invention may be had by referring to the drawing accompanying and forming a part of this specification in which like reference characters designate the same or similar parts in the various views.

Figure 1 is an elevation of a Corliss engine cylinder showing means for controlling the power delivered by the engine by variations in the temperature and pressure of the exhaust, the controlling means being shown partly in section.

Fig. 2 is a diagrammatic disclosure of a system involving an application of the present invention.

Referring specifically to Fig. 2, the main power line 7 is normally supplied with power by main generators 5, 6, driven by energy translating devices or heat engines 2, 3, respectively. In Fig. 2 the energy translating devices are shown as heat engines or steam turbines 2, 3, while the generators 5, 6, are disclosed as of the alternating current type. It is not, however, intended to limit the present invention by such disclosure as other forms of energy translating devices and generators within the scope of the appended clair s, might be substituted for those disclosed, providing they operate in synchronism to determine the constant speed of one of them supplying a heating system. An auxiliary energy translating device or heat engine, disclosed in Fig. 2 as a steam turbine 1, and in Fig. 1 as a Corliss engine 21, is drivingly connected to an auxiliary generator 4, which also delivers its power to the main power line 7. The auxiliary heat engine or turbine 1 is supplied with motive fluid through the inlet pipe 8, the flow of motive fluid being controllable by means of a throttle valve 18. The auxiliary heat engine or turbine 1 delivers its exhaust into an exhaust pipe 9, which leads to a low pressure heater 10, or to some other point at which it is desired to utilize the exhaust steam. The subject of industrial application of the steam which is shown as a low pressure heater 10, may be either a heating system, a cooking device, heaters in a woolen or cotton mill, or any other device for utilizing low pressure steam at a substantially constant temperature or pressure. While it is desired in the present disclosure, to maintain the pressure and the temperature substantially constant, it may sometimes be desirable in some forms of heat engines to maintain only one of these characteristics substantially constant irrespective of variations in the other, such departure from the present operation within the scope of the appended claims, being within the scope of the present invention.

The turbine 1 is provided with a safety governor 12 which is so set either by weighting or otherwise setting the same, that its collar will remain in engagement with a stop 23 and will leave this stop and act upon the throttle valve 18 only upon abnormal speed changes. The collar of the governor 12 engages and serves as a fulcrum for an end of a floating lever 13, the mid portion of which is pivoted to a movable cup-shaped plunger 14, and the opposite end of which is connected to the throttle valve 18. The cup-shaped plunger 14 is reciprocable upon a stationary abutment 17. A helical spring 15 has an end engaging a flange of the plunger 14 and has its opposite end reacting against the adjustable spring support 16. The plunger 14 is movable in opposition to the pressure of the spring 15 by means of fluid pressure applied to the interior of the plunger 14 and of the abutment 17, through the pipe 11 which communicates with the turbine exhaust 9. The spring support 16 is adjustable to vary the pressure exerted by the spring 15 upon the plunger 14 by any suitable means, such as an electric adjusting motor or a hand-wheel. This adjustment of the spring 15 provides means for adjusting the position of the throttle valve 18 to establish a predetermined constant pressure in the exhaust pipe 9.

In the arrangement of elements disclosed in Fig. 1, the heat engine is disclosed as a Corliss engine 21, having knock-off levers 19, 20, for controlling the admission of steam to, and consequently the power furnished by, the engine. The steam is admitted to the Corliss valves in the usual manner by means of a steam pipe 28, being exhausted from the engine 21 through an exhaust pipe 29. The Corliss engine 21 is prevented from over-speeding by means of a fly-ball governor 212, which is so set by weighting or otherwise, as to come into action only upon excessive changes in speed. The floating lever 33 which engages and normally utilizes the collar of the governor 212 as a fulcrum, has its mid portion connected by means of a link 32 to the upper end of the movable cup-shaped plunger 34. The plunger 34 is reciprocable upon the stationary abutment 38, the interior of which, as well as the interior of the plunger, being filled with oil. The free end of the lever 33 is connected by means of suitable linkage to the knock-off levers 19, 20, so that any movement of the lever 33 caused by movement of either the plunger 34 or the governor collar, is transmitted to the knock-off levers 19, 20, to change the point of cut off.

The exhaust pipe 29 is connected by means of a pipe 211 to the upper end of an oil chamber 30. The oil chamber 30 is substantially filled with oil and has a pipe 31 connecting the lower portion of the oil bath with the upper interior portion of the abutment 38. The pressure exerted by the exhaust steam in the exhaust pipe 29 is transmitted through the pipe 211 to the upper surface of the oil in the chamber 30, being further transmitted by this oil through the pipe 31 to the upper interior surface of the plunger 34. The helical spring 35 has its upper end engaging a flange on the plunger 34 and has its opposite end reacting against the adjustable spring support 36. The support 36 is adjustable to vary the spring pressure and hence the position of the plunger 34 either from the main switchboard by means of a motor 37, or manually by means of a suitable hand-wheel 39 mounted upon the shaft of the motor 37. The shaft of the adjusting motor is connected by means of suitable gearing to a screw-threaded rod which carries the spring support 36 and the screw threads of which engage threads in the frame which supports the abutment 38. By adjusting the spring support 36, the position of the knock-off levers may be readily varied to establish a predetermined constant pressure and temperature in the exhaust pipe 29.

During the normal operation of the system as disclosed in Fig. 2, the turbines 2, 3, and the generators 5, 6, are supplying current to the main power line 7. If no steam is being utilized at the low pressure heater 10, the throttle valve 18 of the auxiliary heat engine or turbine 1 is closed and the switch 50 connecting the generator 4 with the main line 7 is preferably opened. If the switch 50, at times when no steam is being utilized in the low pressure heater 10 is closed, the generator 4 will be operated as a motor and will be driving the turbine 1, this being an unusual condition of operation of the system. As such a condition of operation is undesirable, if no steam is to be utilized in the heater for any length of time, it is preferable to cut out the generator 4 from the main line 7 by opening the switch 50 until it is again desired to utilize the low pressure steam.

When it is desired to use steam in the heater, the switch 50 is closed and the throttle valve 18 is opened until the desired pressure and temperature is established in the exhaust pipe 9. The pressure in the exhaust pipe 9 then automatically acts through the pipe 11 upon the interior of the abutment 17 and forces the plunger 14 in a downward direction tending to close the throttle valve 18. By adjusting the position of the spring support 16, the amount of steam admitted to the turbine and the pressure in the pipe 9 may be readily varied to suit the required conditions.

The operation of the device disclosed in Fig. 1 is analogous to that of the device disclosed in Fig. 2. The engine is started by manipulating the throttle in the usual manner and adjusting the spring support 36, either by means of the motor 37 or the hand-wheel 39, after which the position of the knock-off levers 19, 20, is automatically controlled by the steam pressure in the exhaust pipe 29 acting through the pipe 211, oil chamber 30, pipe 31, and plunger 34. If the pressure in the exhaust pipe 29 increases, the knock-off levers 19, 20, will be adjusted so as to decrease the amount of steam admitted to the engine 21, thereby decreasing the power furnished by the engine. If the pressure in the exhaust pipe 29 decreases, the knock-off levers 19, 20, will be adjusted to increase the amount of steam admitted to the engine, thereby increasing the power delivered by the engine.

As the generator 4 is operating synchronously in parallel with the generators 5, 6, the speed of the auxiliary engine driving the generator 4 will be maintained substantially constant irrespective of the amount of energy supplied to the engine or of the power delivered by the engine. The regulating device applied to the auxiliary engine for a predetermined setting or adjustment of the spring, automatically controls the admission of motive fluid so as to maintain substantially constant the pressure and hence the temperature of the exhaust. The slightest variations in exhaust pressure will act immediately to vary the amount of motive fluid admitted to the engine so as to reestablish the desired exhaust pressure and maintain the same substantially constant. While in the present disclosure due to the use of steam as a motive fluid, the maintaining of a constant temperature of the exhaust accompanies maintaining a constant pressure thereof, it will be noted that the exhaust temperature with the use of other motive fluids, might also be maintained constant irrespective of the pressure thereof. It will be noted that the spring 15, 35, may be adjusted either to produce predetermined pressures in the exhaust to suit various conditions in the heater or to vary the relation between the energy supplied to, and the energy abstracted by, the engine.

By controlling the speed of the auxiliary heat engine by parallel operation of the same with other electrical units, the speed of this engine will be automatically maintained substantially constant. If, however, the main line 7 should fail to receive a supply of current from the generators 5, 6, or if the connection between the generator 4 and the main line 7 should be broken, overspeeding of the auxiliary unit will be prevented by means of the safety governor 12, 212, which will automatically act to reduce the admission of motive fluid to the auxiliary prime mover.

It should be understood that it is not desired to be limited to the exact details of construction shown and described, for obvious modifications within the scope of the appended claims will occur to a person skilled in the art.

It is claimed and desired to secure by Letters Patent,—

1. In combination, an energy translating device connected to an energy absorbing system, means connected to said system determining the speed of said energy translating device, said device having an inlet for a supply of expansible fluid, an outlet for said device discharging the entire exhaust only to an industrial supply, and means controlling the supply of expansible fluid responsive to the pressure at said exhaust outlet, whereby the tension of the fluid at said exhaust outlet is kept substantially constant even though the tension of the supply varies and the load on said system varies.

2. In combination, an energy translating device having an inlet for a supply of expansible fluid, an outlet for exhausting said fluid at a lower tension, and means for keeping the speed of said energy translating device substantially constant other than by varying the condition of said supplied expansible fluid.

3. In a system with variable demand for total translated energy, the method of operating an energy translating device capable of delivering energy having an inlet for a supply of expansible fluid and an outlet for exhausting said fluid at a lower tension for further utilization at variable demand, which consists in keeping substantially constant the amount of translated energy delivered by said energy translating device corresponding to any one predetermined demand for expansible fluid at the outlet.

4. The method of operating an energy translating device having an inlet for a supply of expansible fluid and an outlet for exhausting said fluid, which consists in controlling the speed of said device by means extraneous to said device, and controlling the supply of expansible fluid to said device only in accordance with the condition of the fluid at the outlet.

5. The method of operating an energy translating device having an inlet for a supply of expansible fluid and an outlet for exhausting said fluid, which consists in keeping the speed of said device substantially constant by means extraneous to said device whereby the tension of the fluid at the outlet may be kept substantially constant by controlling the fluid at the inlet.

6. The method of operating an energy translating device having an inlet for a supply of expansible fluid and an outlet for exhausting said fluid, which consists in keeping the speed of said device substantially constant by means extraneous to said device and contemporaneously controlling said fluid so as to keep the tension of said fluid at said outlet substantially constant.

7. The method of operating an energy translating device having an inlet for a supply of expansible fluid and an outlet for exhausting said fluid for further utilization at variable demand, which consists in keeping the speed of said device substantially constant by means extraneous to said device and also, for any one predetermined demand, in keeping the tension of said fluid at the inlet substantially constant so that the tension of said fluid at the outlet will be substantially constant.

8. In combination, an energy translating device having an inlet for a supply of expansible fluid, an outlet for exhausting said fluid at a lower tension, an alternating current generator operatively connected to said energy translating device, means independent of the condition of said fluid for keeping the frequency at the terminals of said generator substantially constant, and means dependent on the tension of the fluid at said outlet for regulating the supply of fluid at the inlet, whereby the tension at the outlet is kept substantially constant.

9. In combination, an energy translating device having an inlet for a supply of expansible fluid, an outlet for exhausting said fluid at a lower tension for further utilization at variable demand, means furnishing a variable supply of translated energy in response to a variable demand and constituting the sole means for keeping the speed of said energy translating device substantially constant, and means for controlling the tension of the fluid at the inlet to keep the said tension substantially constant for any one predetermined demand for said lower tension fluid, whereby the tension of the fluid at the outlet is kept substantially constant.

10. In combination, an energy translating device having an inlet for a supply of expansible fluid, an outlet for exhausting said fluid at a lower tension, a dynamo electric machine operatively related to said energy translating device, means independent of the condition of said expansible fluid for keeping the speed of said dynamo electric machine and device substantially constant, and means operating through control of said fluid for keeping the tension of the fluid at said outlet substantially constant during effective operation of said independent means.

11. In combination, an energy translating device connected to an energy absorbing system, means connected to said system determining the speed of said energy translating device, said device having inlet means for a supply of expansible fluid and outlet means for exhausting said fluid, and means for controlling the admission of fluid at the inlet means in accordance with the condition of the fluid at the outlet means.

In testimony whereof, the signature of the inventor is affixed hereto.

REGINALD F. SMITH.